E. H. SCHULTZ.
MACHINE FOR SHAPING, ROLLING, AND WELDING BOILER FLUE TUBES.
APPLICATION FILED DEC. 19, 1913.
1,151,621.
Patented Aug. 31, 1915.
2 SHEETS—SHEET 1.
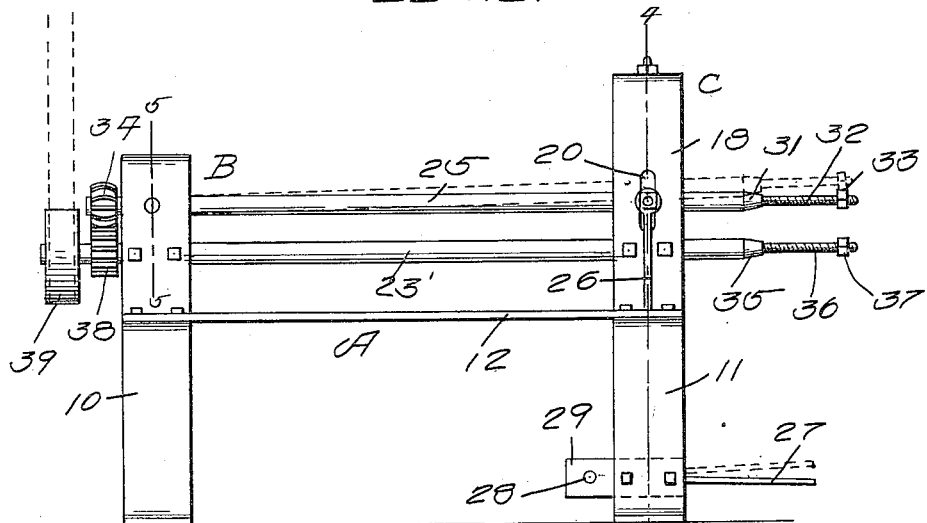
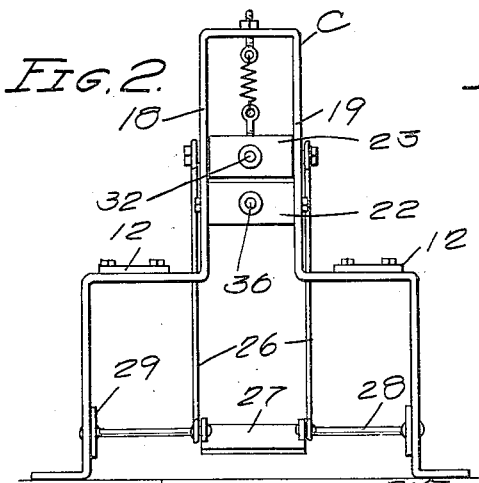
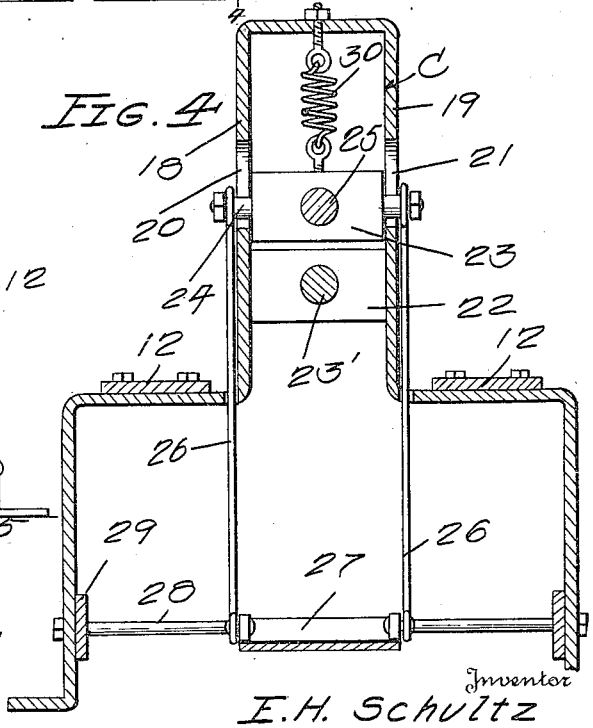
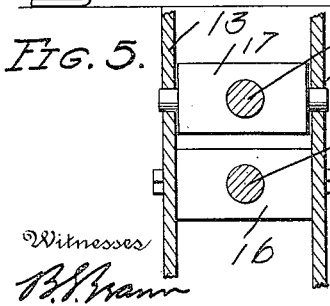
Witnesses
Inventor
E. H. Schultz
Attorneys

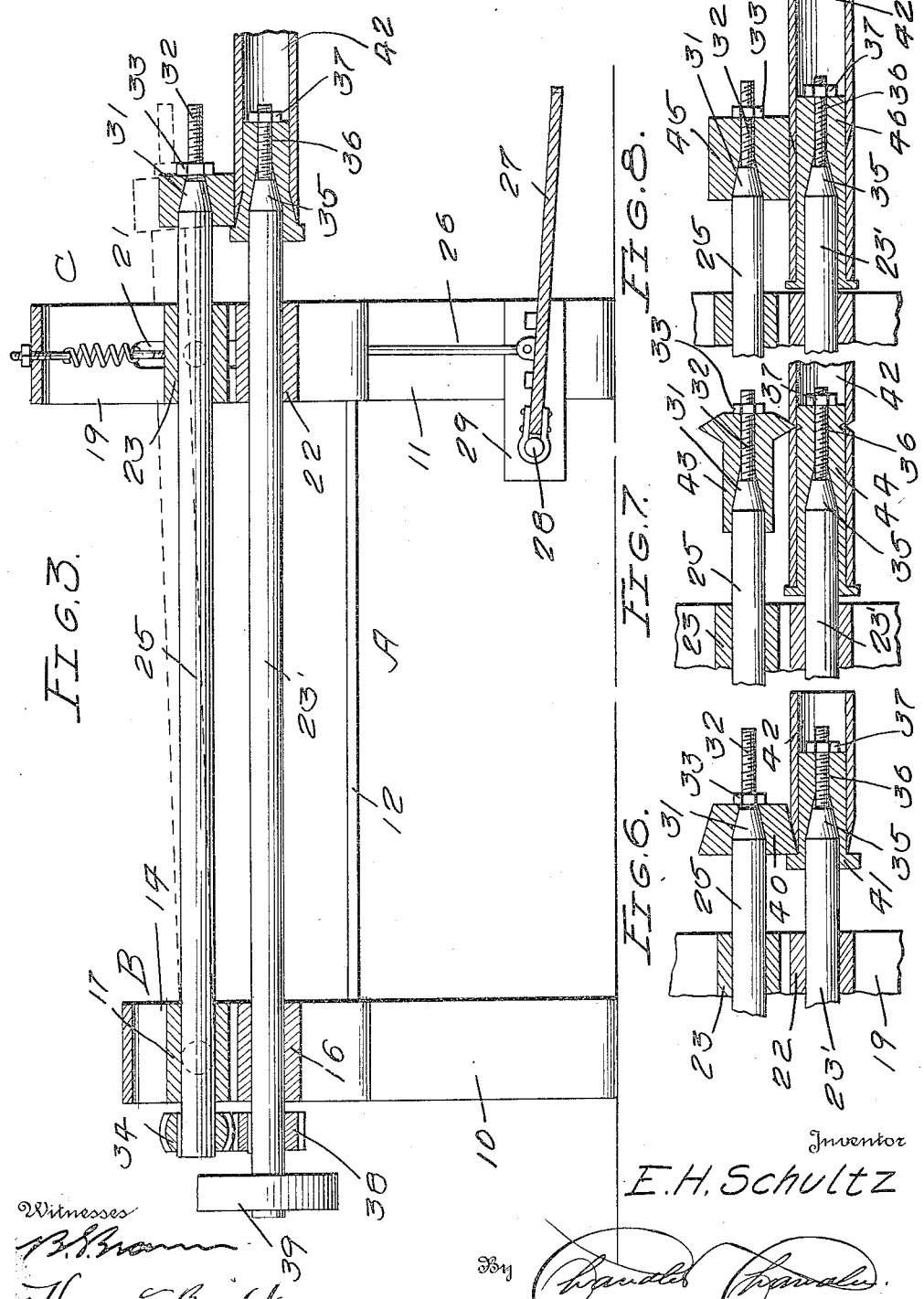

UNITED STATES PATENT OFFICE.

EMIL H. SCHULTZ, OF EVERETT, WASHINGTON.

MACHINE FOR SHAPING, ROLLING, AND WELDING BOILER-FLUE TUBES.

1,151,621.  Specification of Letters Patent.  Patented Aug. 31, 1915.

Application filed December 19, 1913. Serial No. 807,724.

*To all whom it may concern:*

Be it known that I, EMIL H. SCHULTZ, a citizen of the United States, residing at Everett, in the county of Snohomish, State of Washington, have invented certain new and useful Improvements in Machines for Shaping, Rolling, and Welding Boiler-Flue Tubes; and I do hereby declare the following to be a full, clear, and exact description of the invention, such as will enable others skilled in the art to which it appertains to make and use the same.

This invention relates to machines for shaping, rolling and welding boiler flue tubes.

The object of the invention resides in the provision of a machine of the character named which will efficiently perform the work required thereof, and which will be simple in construction, easily operated and which can be manufactured at a comparatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of the invention; Fig. 2, an end view of same; Fig. 3, a vertical longitudinal section of the invention; Fig. 4, a section on the line 4—4 of Fig. 1; Fig. 5, a section on the line 5—5 of Fig. 1; Fig. 6, a detail view showing tools mounted on the machine for shaping a tube for welding; Fig. 7, a view similar to Fig. 6 showing tools mounted on the machine for cutting tubes, and Fig. 8, a view similar to Fig. 6 showing tools mounted on the machine for welding the sections of a tube together.

Referring to the drawings the machine is shown as comprising a frame A including end members 10 and 11 connected together by longitudinal members 12. These end members 10 and 11 are provided with upwardly extending U-shaped portions B and C respectively. The U-shaped portion B includes arms 13 and 14 between which is fixed a bearing 16. Swiveled between the arms 13 and 14 is a bearing 17. The U-shaped portion C embodies arms 18 and 19 provided respectively with longitudinal slots 20 and 21 disposed in alinement with each other. Fixed between the arms 18 and 19 is a bearing 22 disposed in line with the bearing 16 and rotatably mounted in the bearings 16 and 22 is a shaft 23′. Disposed between the arms 18 and 19 above the bearing 22 is a bearing 23 provided with trunnions 24 slidably engaged through the slots 20 and 21 respectively. Journaled in the bearings 17 and 23 is a shaft 25. Swiveled upon the trunnions 24 respectively are corresponding ends of rods 26, said rods extending downwardly and having their lower ends pivotally connected to a pedal 27 mounted upon a shaft 28 which latter is rotatably mounted in brackets 29 carried by the end member 11. The bearing 23 is normally held elevated by a spring 30 one end of which is secured to the bearing 23 and the other end to the arm connecting portion of the U-shaped member C. One end of the shaft 25 is extended through the bearing 23 and tapered as at 31, said end of the shaft 25 terminating in a reduced threaded portion 32 upon which is adapted to be engaged a nut 33. The other end of the shaft 25 is extended through the bearing 17 and has fixed thereon a gear 34 which has the free ends of its teeth curved so as to permit pivotal movement of the bearing 17. One end of the shaft 23′ is extended through the bearing 22 and provided with a tapered portion 35, said end of the shaft 23′ terminating in a reduced threaded portion 36 upon which is engaged a nut 37. The other end of the shaft 23′ is extended through the bearing 16 and has fixed thereon a gear 38 which meshes with the gear 34 on the shaft 25. Also fixed on the shaft 23′ outwardly of the gear 38 is a belt pulley 39 whereby the machine may be connected with a suitable source of power for the purpose of operating same.

In Fig. 6 there is shown mounted on the ends of the shaft 23′ and 25 adjacent the end member 11 tools 40 and 41 adapted to be brought into coöperative relation by pressing down upon the pedal 27, such pressure serving to rock the pedal and move the bearing 23, shaft 25 and tool 40 downwardly so as to bring the tool 40 into operative relation to the tool 41 which latter carries the pipe section 42 as clearly disclosed in the drawing.

In Fig. 7 there is shown mounted on the shafts 25 and 23' respectively coöperating tools 43 and 44 utilized for the purpose of cutting a tube, while in Fig. 8 there is shown mounted upon the shaft 25 and 23' coöperating tools 45 and 46 respectively which are utilized in the operation of welding pipe sections together, it being noted that the machine is operated in precisely the same manner with each set of tools.

What is claimed is:—

In a machine for preparing and welding tube joints, the combination of a frame including spaced end members having inverted U-shaped upper portions, alined fixed bearings mounted between the arms of said upper portions respectively, a shaft journaled in said fixed bearings, a pivoted bearing mounted between the arms of one of said U-shaped portions above one of the fixed bearings, the arms of the other U-shaped portion being provided with alined longitudinal slots, a bearing having lateral studs slidably engaged in said slots and the sides of said bearing continuously engaging the inner faces of the slotted arms of the U-shaped member.

In testimony whereof, I affix my signature, in the presence of two witnesses.

EMIL H. SCHULTZ.

Witnesses:
FRANK GRIEPERSTROG,
FRED W. SCHULTZ.

Copies of this patent may be obtained for five cents each, by addressing the "Commissioner of Patents, Washington, D. C."